United States Patent
Giladi et al.

(10) Patent No.: US 12,301,956 B2
(45) Date of Patent: *May 13, 2025

(54) CONTENT INFORMATION FOR MANIFEST DETERMINATION

(71) Applicant: Comcast Cable Communications, LLC, Philadelphia, PA (US)

(72) Inventors: Alexander Giladi, Denver, CO (US); Yasser Syed, La Crescenta, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/440,858

(22) Filed: Feb. 13, 2024

(65) Prior Publication Data

US 2024/0267598 A1    Aug. 8, 2024

Related U.S. Application Data

(63) Continuation of application No. 17/819,144, filed on Aug. 11, 2022, now Pat. No. 11,956,517, which is a continuation of application No. 17/231,911, filed on Apr. 15, 2021, now Pat. No. 11,445,270.

(60) Provisional application No. 63/010,587, filed on Apr. 15, 2020.

(51) Int. Cl.
   H04N 21/8352    (2011.01)
   H04N 21/84      (2011.01)
   H04N 21/845     (2011.01)

(52) U.S. Cl.
   CPC ......... H04N 21/8352 (2013.01); H04N 21/84 (2013.01); H04N 21/845 (2013.01)

(58) Field of Classification Search
   CPC .. H04N 21/8352; H04N 21/84; H04N 21/845; H04N 21/854
   See application file for complete search history.

(56) References Cited

U.S. PATENT DOCUMENTS

| | | |
|---|---|---|
| 10,057,366 B2 | 8/2018 | Su et al. |
| 10,834,158 B1 | 11/2020 | Bourgoyne et al. |
| 10,951,960 B1 | 3/2021 | Wu et al. |
| 11,445,270 B2 | 9/2022 | Giladi et al. |
| 11,546,400 B2 | 1/2023 | Loheide et al. |
| 2007/0250901 A1* | 10/2007 | McIntire .......... H04N 21/47815 348/E7.071 |
| 2012/0198031 A1 | 8/2012 | Bouazizi |
| 2013/0117413 A1 | 5/2013 | Kaneko et al. |
| 2014/0006564 A1 | 1/2014 | Thang et al. |
| 2014/0096271 A1 | 4/2014 | Wang et al. |
| 2016/0048294 A1 | 2/2016 | Micheva et al. |
| 2016/0127440 A1 | 5/2016 | Gordon |

(Continued)

OTHER PUBLICATIONS

US Patent Application filed on Apr. 15, 2021, entitled "Content Information for Manifest Determination", U.S. Appl. No. 17/231,911.

(Continued)

*Primary Examiner* — Fernando Alcon
(74) *Attorney, Agent, or Firm* — BakerHostetler

(57) ABSTRACT

Methods and systems are described for managing content. A content asset may be stored as a plurality of content segments. The plurality of content segments may comprise one or more identifiers that may be used to generate a manifest file for playback of the content asset.

27 Claims, 7 Drawing Sheets

(56) References Cited

U.S. PATENT DOCUMENTS

| | | | |
|---|---|---|---|
| 2016/0149978 | A1 | 5/2016 | Wissingh et al. |
| 2017/0048294 | A1 | 2/2017 | Kwak et al. |
| 2017/0366515 | A1 | 12/2017 | Wood |
| 2018/0035176 | A1* | 2/2018 | Stockhammer .... H04N 21/8586 |
| 2018/0077210 | A1* | 3/2018 | Hannuksela ....... H04N 21/8456 |
| 2018/0191796 | A1 | 7/2018 | Gandhi et al. |
| 2018/0242028 | A1* | 8/2018 | Van Brandenburg ........................ H04N 21/8456 |
| 2019/0313147 | A1 | 10/2019 | Cava et al. |
| 2019/0349629 | A1 | 11/2019 | Stockhammer |
| 2020/0304554 | A1 | 9/2020 | Stockhammer |
| 2021/0099509 | A1 | 4/2021 | Sodagar |
| 2021/0127181 | A1 | 4/2021 | Ramot |
| 2021/0168416 | A1 | 6/2021 | Weiner et al. |
| 2021/0211748 | A1 | 7/2021 | Terem et al. |
| 2021/0211762 | A1 | 7/2021 | Sodagar |
| 2021/0227231 | A1 | 7/2021 | Hannuksela et al. |
| 2022/0272423 | A1 | 8/2022 | Dhruv et al. |
| 2022/0321972 | A1 | 10/2022 | Chandrashekar et al. |
| 2022/0335720 | A1* | 10/2022 | Chang ..................... A63F 13/60 |
| 2022/0337879 | A1 | 10/2022 | Wang |
| 2022/0369000 | A1 | 11/2022 | Bouazizi et al. |
| 2023/0217086 | A1 | 7/2023 | Beilis-Lev et al. |
| 2024/0022792 | A1* | 1/2024 | Sodagar ........... H04N 21/23439 |
| 2024/0031619 | A1* | 1/2024 | Jayaram ........... H04N 21/23418 |
| 2024/0284000 | A1* | 8/2024 | Schreiner ......... H04N 21/44008 |

OTHER PUBLICATIONS

US Patent Application filed on Aug. 11, 2022, entitled "Content Information for Manifest Determination", U.S. Appl. No. 17/819,144.

* cited by examiner

CONTENT INFORMATION FOR MANIFEST DETERMINATION

CROSS REFERENCE TO RELATED APPLICATIONS

This application is a continuation of U.S. patent application Ser. No. 17/819,144, filed Aug. 11, 2022, now U.S. Pat. No. 11,956,517, which is a continuation of U.S. patent application Ser. No. 17/231,911, filed Apr. 15, 2021, now U.S. Pat. No. 11,445,270, which claims priority to U.S. Provisional Application No. 63/010,587 filed Apr. 15, 2020, each of which are hereby incorporated by reference for any and all purposes.

BACKGROUND

In context of adaptive streaming, a media presentation, such as a content asset, may comprise a collection of content segments and a manifest file. A manifest file may describe available representations, or profiles, to which content segments belong and how segments from different representations relate to each other. If the manifest file does not exist or is lost, content segments may become inaccessible in the content management system. Additionally, formats, such as common media application format (CMAF) may attempt to provide a standardization for content segments, but do not address some inefficiencies that remain in a content system. Thus, there is a need for more sophisticated and efficient content management to allow recovery or generation of missing information.

SUMMARY

Disclosed herein are techniques for managing content. A first content device may receive content from a content source and generate (e.g., by encoding, segmenting the content) a plurality of content segments. The first content device may determine content information associated with the content (e.g., or associated with the process of generating the plurality of content segments). The content information may comprise identifiers that correspond to data structure elements for a manifest file (e.g., whether currently or not yet created). The content information may be added to the plurality of content segments. The plurality of content segments may be sent to a second content device. The second content device may determine the content information (e.g., by analyzing one or more fields in or more of the plurality of content segments).

The content information may be used to locate a manifest file if a copy of the manifest file exists in another location. The content information may be used by the second device to generate a manifest file. The identifiers may be used to determine a logical structure of the manifest file. The identifiers may be used to determine which subsets of the plurality of content segments are associated with corresponding data structure elements (e.g., manifest data structure elements), such as period elements (e.g., indicating scenes, ads), adaptation set elements (e.g., indicating video tracks, audio tracks), representation elements (e.g., indicating a specific encoding with a specific resolution, size, bandwidth). The data structure elements may be added to a shell manifest file to generate the manifest file for the plurality of content assets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Disclosed herein are methods and systems for managing content. Content files may become separated from and/or may not be associated with a corresponding manifest file. A manifest file (e.g., a media presentation description (MPD) for dynamic adaptive streaming over HTTP (DASH), an m3u8 for HTTP live streaming (HLS), etc.) may be needed by a user device to perform playback of the content. Content information (e.g., IDs, universally/globally unique IDs) may be embedded into content segments (e.g., video files/segments). The content information may be sufficient to later associate the content segments with a corresponding manifest file. The content information may also be used to tag content files before a manifest file is created, such that later when a manifest file is created, the media files can be assembled into a file and/or associated with a manifest file based on the content information. The disclosed techniques may be codec agnostic, as content segments with the content information can be encoded by any method.

Conventional approaches are susceptible to man-in-the-middle attacks and may be grossly inefficient. The present disclosure may solve at least in part these problems as well as other problem at least by preventing the need to resend missing manifest files. The present disclosure allows for content segments, regardless of location and codec used, to be analyzed to determine or generate a manifest dynamically.

Figure 1:
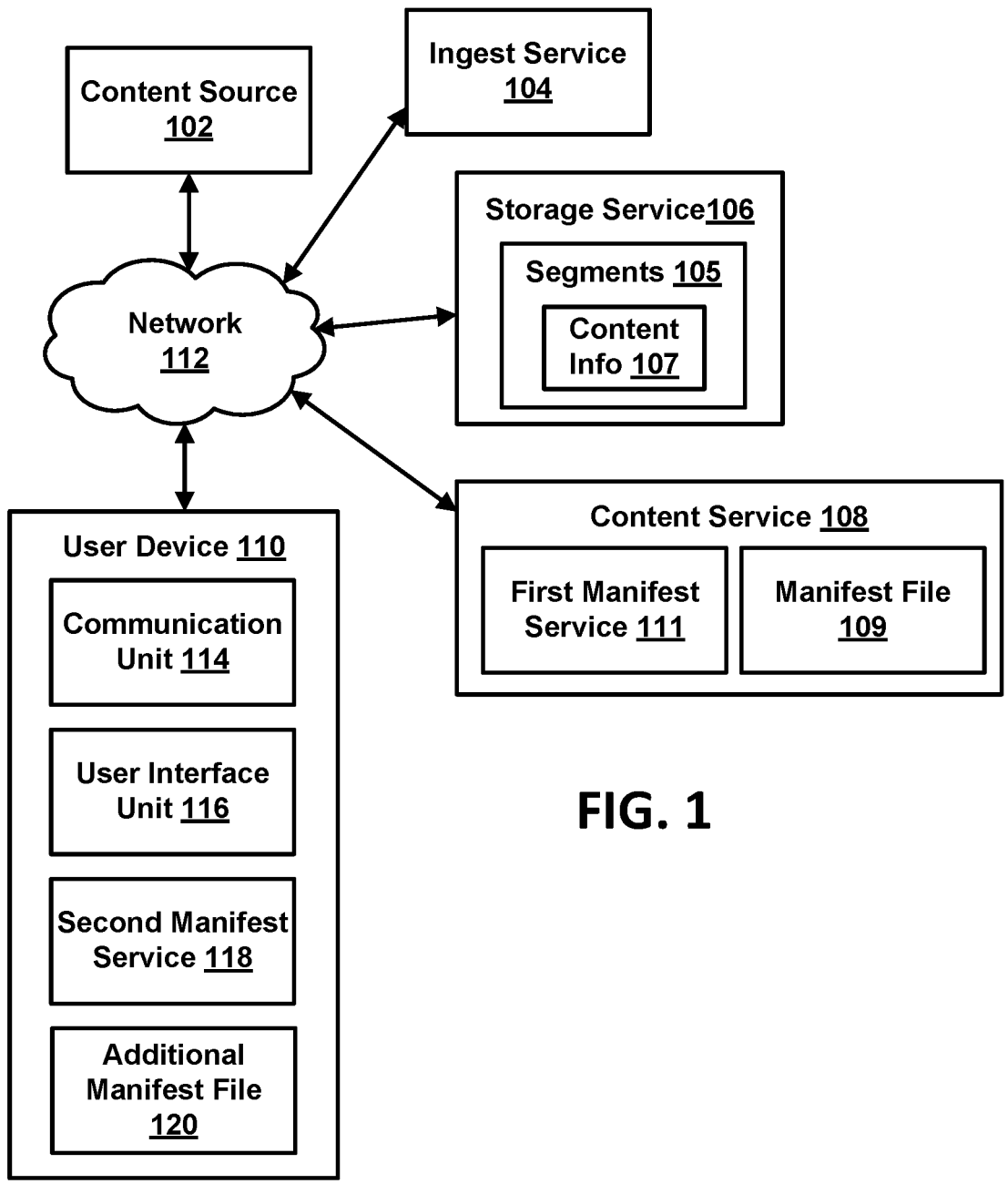
FIG. 1 shows an example system for processing content.

FIG. 1 is a block diagram showing an example system 100 for managing content. The system 100 may comprise one or more of a content source 102, an ingest service 104, a storage service 106, a content service 108, and a user device 110. The content source 102, the ingest service 104, the storage service 106, the content service 108, the user device 110, or a combination thereof may be communicatively coupled via a network 112.

The network 112 may comprise a content distribution and/or access network. The network 112 may facilitate communication via one or more communication protocols. The network 112 may comprise fiber, cable, a combination thereof. The network 112 may comprise wired links, wireless links, a combination thereof, and/or the like. The network 112 may comprise routers, switches, nodes, gateways, servers, modems, and/or the like.

The ingest service 104, the storage service 106, the content service 108, or a combination thereof may be implemented by one or more computing nodes. A computing node may comprise a virtual machine, processor, computing device, or a combination thereof. The ingest service 104, the storage service 106, and/or the content service 108 may each be implemented on separate computing nodes (e.g., on separate computing devices). The ingest service 104, the storage service 106, and/or the content service 108 may each be implemented on the same computing node (e.g., on the same computing device). The ingest service 104, the storage service 106, and/or the content service 108 may implemented by a plurality of computing nodes. The plurality of computing nodes may be geographically dispersed (e.g., to allow efficient access to content). The ingest service 104, the storage service 106, and/or the content service 108 may be duplicated at various locations in the network 112.

The content source 102 may be configured to supply content, such as one or more content streams, content files, and/or the like. The content may comprise video data, audio data, closed caption (CC) data, a combination thereof, and/or the like. The content source 102 may comprise a content channel, a content stream source, a content file source, and/or the like. The content source 102 may be accessed by the ingest service 104 to determine one or more content assets.

The ingest service 104 may comprise a transcoder (e.g., encoder) configured to encode, encrypt, compress, and/or the like the content from the content source 102. The ingest service 104 may be configured to package the content, segment the content, and/or the like. The ingest service 104 may generate (e.g., by subdividing the content) a plurality of content segments 105.

The ingest service 104 may be configured to determine content information (e.g., content description information, content presentation information, media presentation description information). The content information may comprise logical organization information, metadata, description elements, and/or the like associated with presenting the content. The content information may comprise a manifest identifier indicative of a generated manifest for playback of the plurality of content segments 105 (e.g., or for a manifest to be generated in the future).

The content information may comprise one or more logical time periods (e.g., scenes, chapters, ad insertion points) of the content. The ingest service 104 may determine a period identifier for each of the logical time periods. The content information may comprise one or more content sets (e.g., adaptation sets, switching sets) of the content, such as a content set for video and one or more content sets for audio content (e.g., one for each language track). The ingest service 104 may determine a content set identifier (e.g., adaptation set identifier, switching set identifier) for each of the content set.

The ingest service 104 may be configured to encode the content into multiple different sets of the plurality of content segments 105. The content information may comprise one or more encoding sets (e.g., representation sets, resolution sets, bandwidth sets, screen size sets) of the content, such as sets for different resolutions (e.g., SD, HD, HD, 4 k, 1080p, 780p), screen sizes, codecs, and/or the like. The ingest service 104 may determine an encoding set identifier (e.g., representation set identifier) for each of the encoding sets.

The ingest service 104 may be configured determine one or more unique identifiers associated with the content. A unique identifier may comprise a universally unique identifier within a content system, content namespace, and/or the like. A unique identifier may comprise a globally unique identifier. A unique identifier may comprise a unique identifier in context of a specific deployment (e.g., unique to a service provider). A unique identifier may be unique to a data structure level. A universally unique representation identifier (e.g., or encoding identifier) may be unique among all representation identifiers for the content system. A unique adaptation set identifier (e.g., or content set identifier) may be unique among all adaptation set identifiers for the content system. A unique period identifier may be unique among all period identifiers for the content system. A manifest identifier may be unique among all manifest identifiers for the content system.

The unique identifier may be used to uniquely identify a determined set of content information (e.g., for generating a manifest file based on the set of content information). The unique identifier may comprise any of the identifiers described herein, such as the manifest identifier, the encoding identifier, the content set identifier, or the period identifier. In some implementations, the unique identifier may be a separate identifier than the manifest identifier, the encoding identifier, the content set identifier, or the period identifier. Multiple unique identifiers may be used, such as at least two of the manifest identifier, the encoding identifier, the content set identifier, or the period identifier. The system 100 may be configured use at least a unique identifier (e.g., universally unique among all representations of the system) for a collection of content segments associated with a representation (e.g., or encoding set). This configuration may prevent content segments from erroneously being associated with the wrong representation, adaption set, period, or manifest.

The ingest service 104 may be configured to add (e.g., insert) the content information 107 to one or more of the plurality of content segments 105. The content information 107 may be added to the one or more of the plurality of content segments 105 during generation of the plurality of content segments 105. The content information 107 may be determined during pre-processing step before the generation of the plurality of content segments 105. The content information 107 may be added to the one or more of the plurality of content segments 105 after generation of the plurality of content segments 105.

The ingest service 104 may be configured the add the content information 107 by adding one or more identifiers to one of more of the plurality of content segments 105. The one or more identifiers may comprise one or more of the unique identifier, the manifest identifier, the period identifier, the content set identifier, or the encoding set identifier.

The content information 107 may be embedded at the bitstream or/and container level of the content segments 105. The content information 107 may be embedded in a field, header, as a message, and/or the like. AVC (H.264) and HEVC (H.265) bitstreams can store the content information in supplemental enhancement information (SEI) messages for initialization content segments and/or the remaining content segments. In MPEG-2 TS, the content information 107 may be stored asynchronously in sections (e.g., as a descriptor in program mapping table (PMT)) and/or synchronously (e.g., using the MPEG-2 TS adaptation field descriptor framework, EBP or SCTE 35 UPID). In case of ISO-BMFF, the content information can be carried in an ISO-BMFF box. The ISO-BMFF box may be at the file level prior to the 'moov'/'moof' box, and/or within the 'moof'/ 'moov' box (e.g. in a 'meta' box).

In the case of MPEG DASH, the plurality content segments 105 may be uniquely identified by a combination of period ID, adaptation set ID, representation ID, and/or the presentation time of the earliest media sample (e.g. picture) within that content segment. The identifiers may be embedded as content information 107 (e.g., or metadata) into each content segment of the plurality of content segments 105. The content information 107 may comprise globally unique identifier for the MPD to identify content segments associated with different presentations. It should be noted that the representation ID may not the same as track_id field or PID because the latter identifiers may be identical across all representations. The representation ID may be a universally unique identifier at the representation level (e.g., the content system may have no other representation ID with the same value). In one scenario, a representation may correspond to a CMAF track. A CMAF track may comprise a collection of content segments that represent the content at a specific encoding rate.

The content information 107 may comprise alignment information. In some scenarios, multiple adaptation sets may be aligned, but not necessarily mutually switchable at all points. HDR, HD and SD content may not be aligned because SD and HD content segments may be encrypted using different encryption keys. The content information 107 can comprise a list of aligned adaptation set IDs to indicate alignment.

Figure 2:
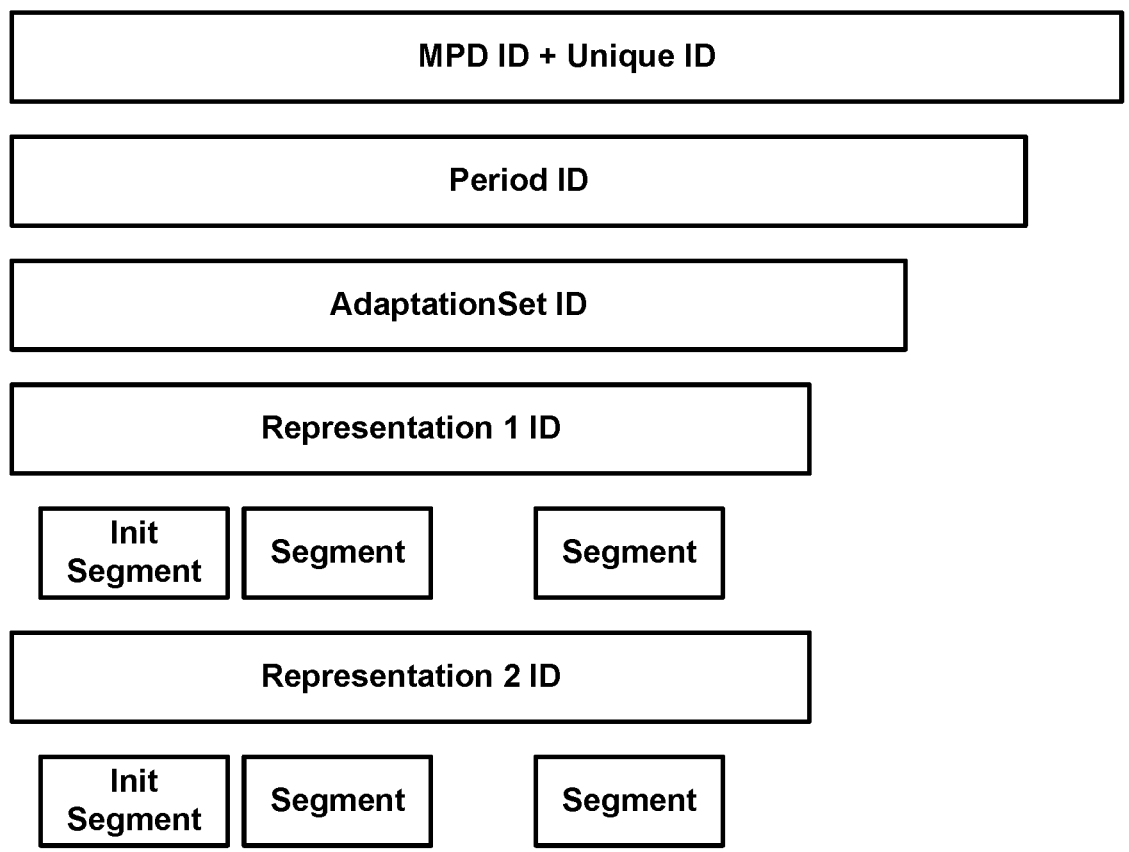
FIG. 2 shows example content information.
Figure 3:
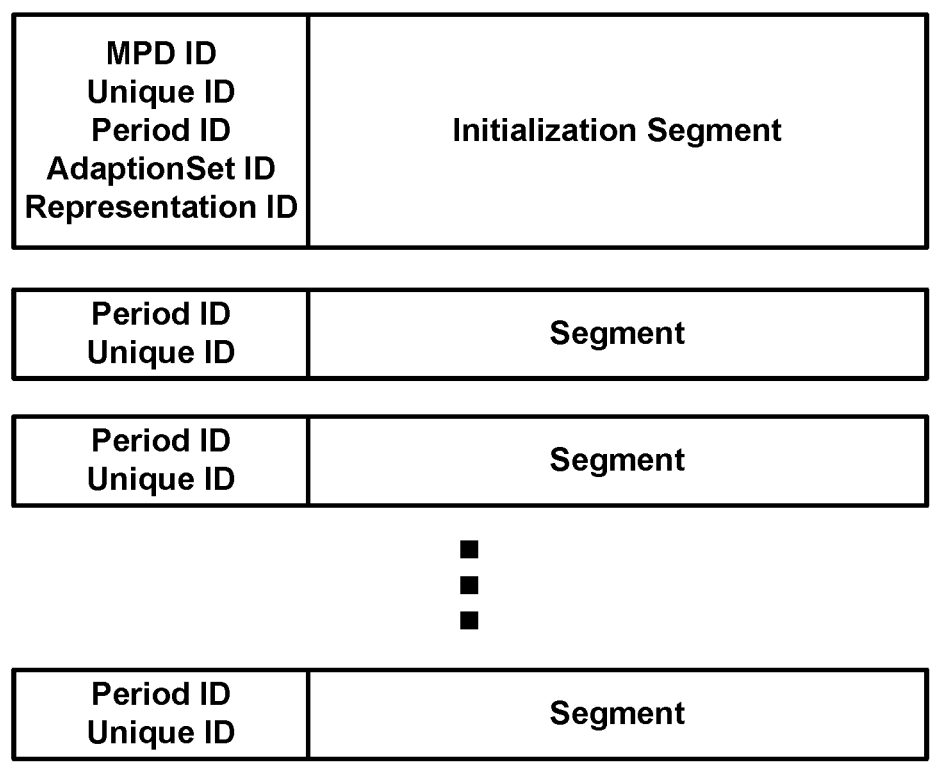
FIG. 3 shows example content segments.

In some implementations, content information 107 may be expanded and/or reduced (e.g., to save space) for certain content segments of the plurality of content segments 105. The content information may be stored in an expanded form in an initialization content segment (e.g., or first content segment, configuration content segment) (e.g., as shown in FIG. 3). The initialization segment may comprise the first content segment of the plurality of content segments (e.g., based on stream time, based on numbering). There may be multiple initialization segments in the plurality of content segments 105 (e.g., as shown in FIG. 2). The plurality of content segments 105 may comprise content segments for more than one representation set (e.g., encoding set). Corresponding content information 107 may be added to each of the initialization segment. The content information 107 stored in the initialization segment may comprise a manifest identifier, period identifier, adaptation set identifier, representation identifier, unique identifier, or a combination thereof. The period identifier can identify if the content segment is part of an advertisement or a content asset (e.g., show, movie, program, audio file). The content information 107 may comprise timing information. The timing information may indicate ordering of content segments (e.g., in a content track).

The content information 107 stored in the initialization content segment may comprise identifiers (e.g., a list, array) of all related representations (e.g., of an adaptation set). A content asset may be encoded into a first plurality of content segments for a first representation (e.g., 1080p resolution) and a second plurality of content segments for a second representation (e.g., 720p resolution) (e.g., as shown in FIG. 2). The initialization content segment for the first representation may comprise a first identifier (e.g., representation identifier) indicating the first representation and a second identifier indicating the second representation. The second identifier may be indicated as identifying a related representation. In some implementations, a different segment or pattern of segments (e.g., than the initialization content segment) may be used to store the content information 107. The last content segment may be used, or every Nth segment may be used. The expanded content information 107 stored in the initialization content segment may be used (e.g., in manifest file generation described further herein) to determine related representations, adaptation sets, and/or like to which the content segment does not belong (e.g., but which may provide sufficient information for generating a manifest file).

A reduced portion of the content information 107 may be stored in content segments other than the initialization content segment (e.g., or other than a configuration content segment). The reduced portion may comprise less information than stored in the initialization content segment. The reduced portion of the content information may comprise a period ID, a unique representation ID (e.g., universally unique for a content system), and/or the like.

The ingest service 104 may be configured to cause the plurality of content segments 105 (e.g., and other data, such as a content manifest or content information) to be stored by the storage service 106. The plurality of content segments 105 may be caused to be stored in a directory, a logical location (e.g., location associated with a uniform resource identifier, such as a URL), and/or the like. The storage service 106 may be implemented via one or more storage devices. Multiple copies of the plurality of content segments 105 may be stored on different storage devices at different geographic locations.

The content service 108 may be configured to manage the content stored by the content service 108. The content service 108 may be implemented as one or more servers of a content distribution network and/or content access network. The one or more servers may comprise an origin server, and edge server, a combination thereof and/or the like. The content service 108 may comprise a packaging service, such as a just in time packager, and/or the like.

The content service 108 may be configured to determine (e.g., generated, accessed) a manifest file 109 for playback of the plurality of content segments 105 stored by the storage service 106. The manifest file 109 may be determined (e.g., generated, accessed) by a first manifest service 111 of the content service 108. The manifest file 109 may be determined based on a triggering event, such as a request event (e.g., a request for a content asset associated with the plurality of content segments), a maintenance event (e.g., a deletion event, clean-up event), a storage event (e.g., receiving the plurality of content segments, detecting a change to the plurality of content segments), a packaging event (e.g., packaging of the plurality of content segments), a detection event (e.g., detection that a manifest is missing, inaccessible, and/or not in the directory in which the content segments are stored), a failure event (e.g., failure to complete packaging of the plurality of content segments, a configuration failure), a combination thereof, and/or the like. The content service 108 may attempt to locate the manifest file if the triggering event occurs. If the manifest file can not be located, the content service 108 (e.g., the first manifest service 111) may generate the manifest file. In some scenarios, the manifest file 109 may be generated without attempted to locate the manifest file.

The content service 108 (e.g., the first manifest service 111) may generate a manifest file 109 based on the content information 107 in the plurality of content segments 105, and/or supplemental information (e.g., default or otherwise determined information). The content information 107 may be supplemented with other existing information, such as manifest file templates, information associated with identifiers, manifest elements structure definitions and/or the like. This supplemental information may be used to generate the manifest file 109 (e.g., along with the content information 107).

Information about periods of the content asset may be determined using a service, such as the first manifest service 111. Periods may be created for ad insertion, chapters, scenes, and/or the like. Supplemental information relevant to periods may be retrieved through a query to another service, such as an Ad services systems. The other service may send a message indicating breakpoints in the content asset. If a content segment is MPEG-2 TS based in the track itself, SCTE 35 information (e.g., or other advertising signals) could be retrieved through the standard identified PID and aligned. Additionally or alternatively for TS and ISO-BMFF formats, an emsg may be employed to carry out the same function.

Information about adaptation sets of the content segments may be determined from a template manifest for a general content asset. Most manifests in an adaptive streaming content asset service are similar in makeup for the content asset since the same level of service needs to be provided for all the content assets. A certain number of media components (e.g., video, primary audio, secondary audio) may be identified using as one or more adaptation sets. Supplemental information about representations may be determined from default configuration settings associated with a content service, such as a content service used to access the content asset.

Within the set of content segments, content information 107 may be determined. The content information 107 may indicate order and content continuity within the representation. For content segment storage, the plurality of content segments 105 may be stored as a complete track or may be stored as one or more content segments within a singular stored object. If the plurality of content segments are stored as a track, then the content segments 105 may be stored within the same file. To identify other tracks in a non-multiplex media component setup, a duration field may be used. Other tracks may also be identified by using a switching set and/or adaptation set identifiers. Fields in ISOBMFF or in the TS format may be used to indicate EBP information with wall clock and segment number (e.g., which may be used for ordering content segments in generation of the manifest file 109)

Generating the manifest file 109 may comprise identifying content segments and/or tracks and matching the content segments into a predetermined general template manifest structure. The template manifest file may be modified to adjust for holes and/or gaps that are created due to lack of content segments or tracks. A gap timeline structure can be used to create a playable manifest structure even when many content segments are missing.

The content service 108 can be configured to implement a process for generating a manifest file (e.g., media presentation description). The process may be implemented by the first manifest service 111. The input to the process may comprise the plurality of content segments 105, such as a collection of segments (e.g., stored in a single directory). The input to the process may comprise only a portion of the plurality of content segments 105 generated for a content asset. The output of the process may comprise a valid manifest file. An example process described may comprise a basic implementation in which only a single period is identified. The example process may be described for MPEG-DASH, but the process may be adapted to other content streaming techniques. One or more parts of the process may be repeated for additional periods associated with a content asset. The example process may include any combination of one or more of the following steps:

1. Read one or more (or all) segments and create a list of unique representation UUIDs (e.g., identified in the segments).
2. For each representation UUID, create a list of media segments with this UUID, sorted according to timestamp (e.g., the value of the tfdt box or the first PTS) or other numbering value.
3. Analyze all initialization segments (e.g., in case of ISO-BMFF, this may be all files containing the 'moov' box, in other cases the initialization segment may be indicated by time order (e.g., first in stream time) or other indicator). A dictionary (e.g., an MPD dictionary or other data structure) may be created where a single MPD UUID may be used as a key, and a list of [period ID, representation UUID] tuples may be the value.
4. For each MPD UUID:
    (a) create the MPD element
    (b) For each period ID, create a Period element
    (c) For each Period:
        (1) All initialization segments may be analyzed. Representations with same switching set (e.g., adaptation set) ID may be grouped into the same adaptation sets.
        (2) All lists of media segments within a selection set (e.g., switching set) may be analyzed and/or validated. It may be validated that for any i-th segment in representation X, corresponding i-th segments in any representations Y and Z in this switching set, the segment start time may be identical.
        (3) All segments in one of the lists of media segments may be analyzed. The SegmentTimeline element (e.g., defined in MPEG DASH) may be created, with values of earliest PTS and duration translated into the attributes of the S element. SegmentTemplate may be created with time-based addressing.
        (4) The initialization segments (e.g., CMAF brands or ISO-BMFF sample descriptions or MPEG-2 TS PMT) may be analyzed to extract representation and adaptation set information such as codecs, resolutions, frame rates, aspect ratios, languages, etc. Similarly, information such as accessibility (e.g., whether a representation is regular audio or video descriptions) may be extracted.

The content service 108 may be configured to receive requests for content from a plurality of users. The content may comprise video data, audio data, closed caption (CC) data, a combination thereof, and/or the like. The content may comprise a plurality of content channels, such as live channels, streaming channels, cable channels, and/or the like. The content service 108 may comprise one or more servers.

The user device 110 may be configured to receive the content from one or more of the content service 108 or the storage service 106. The user device 110 may comprise a computing device, smart device (e.g., smart glasses, smart watch, smart phone), a mobile device, a tablet, a computing station, a laptop, a digital streaming device, a set-top box, a streaming stick, a television, and/or the like.

The user device 110 may be configured to receive the content via a communication unit 114. The communication unit 114 may comprise a modem, network interface, and/or the like configured for communication via the network 112. The user device 110 may comprise a user interface unit 116. The user interface unit 116 may be configured to cause display of a user interface. The user interface may be configured to allow the user to browse available content, such as content sent by the content service 108, content stored by the storage service 106, and/or the like. The user interface may be configured to allow users to request content, such as a content channel (e.g., or a content asset being supplied via a content channel), be stored (e.g., recorded) for later viewing. The user interface may be configured to cause storage of the content based on a configuration setting, such as a buffering setting associated with buffering content in storage (e.g., if a user begins watching a channel, if a rule is triggered, if the user is predicted to request the content at a time time).

The user device 110 may comprise a second manifest service 118. The second manifest service 118 may be part of the user interface, user interface unit 116, and/or a separate service. The second manifest service 118 may be configured to determine one or more manifest files, such as the manifest file 109 and/or an additional manifest file 120. The second manifest service 118 may retrieve the manifest file 109 from the content service 108. The second manifest service 118 may generate the additional manifest file 120 based on any of the manifest generation techniques disclosed herein. The second manifest service 118 may perform the example manifest generation process above, any function of the first manifest service 111, and/or any other manifest generation techniques disclosed herein. The second manifest service 118 may analyze all or a portion the plurality of content segments 105. The plurality of content segments 105 may be downloaded to the user device 110 and analyzed to determine the content information 107. The content information 107 may be used to generate the additional manifest file 120.

The system 100 (e.g., the ingest service 104, the content service 108, the storage service 106, the user device 110, or a combination thereof) disclosed herein may be configured to implement packager manifest creation from encoders outputting CMAF segments with identifiers (IDs) and one or more UUIDs. One or more encoders (e.g., of the ingest service 104) may output the plurality of content segments 105 (e.g., CMAF tracks) with embedded content information 107, such as IDs and one or more UUIDs (e.g., manifest identifier, a representation identifiers). The content segments 105 may be received by a packager (e.g., or other device or service). The packager may be part of the ingest service 104, the content service 108, or storage service 106. Based on the embedded information, the packager may generate a manifest file (e.g., manifest file 109, additional manifest file 120) for the content segment. In a first scenario, the packager may have sufficient information from the content information the content segments to generate (e.g., reconstruct) a playable manifest. In a second scenario, the packager determines the UUID(s) and IDs. The UUID(s) and/or IDs may be used by the packager to make a request to a content management system to retrieve any additional data the packager may rely on to create a playable manifest.

The system 100 (e.g., the ingest service 104, the content service 108, the storage service 106, the user device 110, or a combination thereof) disclosed herein may be configured to implement recovery of network distribution of a manifest (e.g., manifest file 109, additional manifest file 120) and content segments (e.g., CMAF Content) for Origin/CDNs/Edge servers. Content Manifests and content segments (e.g., CMAF tracks) may be sent throughout a network (e.g., propagating down the distribution chain). The manifest file and content segments may not arrive at the same exact time to a content device (e.g., origin server, CDN, or edge server). The manifest file may never arrive at the content device and/or become corrupted. The content device (e.g., user device 110, content service 108) may determine content information (e.g., IDs and/or UUIDs) embedded in one or more of the content segments. Using a reverse lookup process, the content device may request a manifest based on the content information embedded in the content segments. The content server may also generate, based on the content information, a manifest file which can configure a user device to playout the content segments.

The system 100 (e.g., the ingest service 104, the content service 108, the storage service 106, the user device 110, or a combination thereof) disclosed herein may be configured to implement recovery from losses from maintenance operations (e.g., network wide delete or replace operations) and/or other events (e.g., failures, updates). The system 100 (e.g., the ingest service 104, the content service 108, the storage service 106, the user device 110, or a combination thereof) may perform a delete or replace operation associated with a content asset. This operation may result in content segments that missing a manifest file or otherwise in a state that is not playable. A content device (e.g., the content service 108, the storage service 106, the user device 110, or a combination thereof) detecting the content segments may determine content information (e.g., IDs and/or UUIDs) embedded in one or more of the content segments. Using at least a part of the content information 107, a manifest file (e.g., manifest file 109, additional manifest file 120) may be created and/or retrieved which can make a playable content asset. If the manifest file is not able to be determined or re-generated, that content segments may be deleted.

The system 100 (e.g., the ingest service 104, the content service 108, the storage service 106, the user device 110, or a combination thereof) disclosed herein may be configured to implement binding server health operations to a content service. Server health operations may comprise one or more processes for determining the health of data stored on the servers. If a server card (e.g., or node, blade, virtual machine) malfunctions, content associated with the server card may become lost or corrupted. The content may comprise a plurality of content segments 105. The remaining plurality of content segments 105 (e.g., which are not lost or corrupted) may be used to determine content information 107 for generating a manifest file (e.g., manifest file 109, additional manifest file 120). Initialization segments and/or other content segments can be determined and/or used (e.g., by the server health operation) to determine the content information. The content information 107 may be used (e.g., by the server health operation) to determine a state of the content segments 105, association of the content segments 105 with a content asset, an indication that the content segments 105 are corrupted or otherwise insufficient to use as playable content. The content information may be used (e.g., by the server health operation) to repair broken content (e.g., by requesting missing content segments, generating a manifest file).

The system 100 (e.g., the ingest service 104, the content service 108, the storage service 106, the user device 110, or a combination thereof) disclosed herein may be configured to implement a process for updating manifest files. Manifest files (e.g., manifest file 109, additional manifest file 120) may be updated based on changes to the contents of a directory storing content. The changes may comprise changes, additions, deletions and/or the like to content tracks (e.g., CMAF tracks) stored in the directory. If three content tracks (e.g., CMAF tracks) are stored in the directory, the manifest file (e.g., manifest file 109, additional manifest file 120) may be generated to reflect the three content tracks. If the directory is updated to include 10 content tracks, the manifest file may be updated to indicate the additional content tracks. An encoder could produce all the content tracks for SD, HD, UHD, or HDR. A manifest file (e.g., manifest file 109, additional manifest file 120) may be generated based on a selection of a subset of the content (e.g., content tracks, CMAF tracks stored in the direct). The selection may occur in response to a request from a user device. Content information may be determined from the subset of the content (e.g., in a header field of one or more content segments). The content information may be used to generate the manifest file.

FIG. 2 shows example content information (e.g., such as content information 107 of FIG. 1). The content information shown in FIG. 2 may be identified and used for generating a manifest by analyzing content segments as described herein.

The content information may comprise one or more identifiers associated with generating a manifest file (e.g., the manifest file 109, the additional manifest file 120 of FIG. 1). The one or more identifiers may comprise identifiers for storing in media presentation description fields of a manifest file. The different sizes of the boxes shown illustrate that the content information can have a logical relationship, such as a hierarchical and/or nested relationship. If a manifest file is generated using the content information, the fields of the manifest file may represent the logical relationship, such as by nesting element tags within other element tags. The highest level of the hierarchy is shown on the top, with lower level elements in the hierarchy further down the page of FIG. 2.

The one or more identifiers may comprise a manifest identifier (e.g., MPD ID). The manifest identifier may be an identifier of a manifest file. The manifest identifier may be a unique identifier (e.g., as indicated by the "+ unique ID"). The manifest identifier may be used as an identifier for a top-level element tag of the manifest file.

The one or more identifiers may comprise a period identifier (e.g., Period ID). The period identifier may be used as an identifier of a period element tag (e.g., or period field) of a manifest file. The period element tag may be an element nested within the top-level element tag. The period element tag may indicate a period, which corresponds to a scene, a chapter, an ad insertion points, and/or the like of the content.

The one or more identifiers may comprise an adaptation-Set identifier (e.g., AdaptationSet ID, switching set identifier, or a content set identifier as described elsewhere herein). The adaptationSet identifier may be used as an identifier of an adaptationSet element tag (e.g., or content set element, switching set element) of a manifest file. The adaptationSet element tag may be an element nested within the period element tag of a manifest file. The adaptationSet identifier (e.g., and element tag) may indicate different portions of the content, such as a video portion and one or more audio portions (e.g., language tracks).

The one or more identifiers may comprise a first representation identifier (e.g., Representation 1 ID, or an encoding set identifier as described elsewhere herein). The first representation identifier may be used as an identifier of a representation element tag (e.g., or content set field) of a manifest file. The representation element tag may be an element nested within the adaptationSet element tag of the manifest file. The first representation identifier may indicate a first representation. The first representation may comprise a first plurality of content segments encoded according to one or more first parameters (e.g., first resolution, first size).

The one or more identifiers may comprise a second representation identifier (e.g., Representation 2 ID, or an encoding set identifier as described elsewhere herein). The second representation identifier may be used as an identifier of another representation element tag (e.g., or content set field) of a manifest file. The second representation identifier may indicate a second representation. The second representation may comprise a second plurality of content segments encoded according to one or more second parameters (e.g., second resolution, second size).

The one or more identifiers may comprise segment identifiers. Each of the first representation and the second representation may have an associated set of content segments. The set of content segments may begin with an initialization segment. Different identifiers of the one or more identifiers may be added to different segments.

FIG. 3 shows example content segments. Content information (e.g., the one or more identifiers of FIG. 2 or content information as elsewhere described herein) may be added to one or more content segments of a plurality of content segments. All of the one or more identifiers may be added to an initialization segment (e.g., the first segment) of the plurality of content segments. A reduced set of the one or more identifiers may be added to the remaining content segments of the plurality of content segments. The reduced set may comprise the period identifier and the unique identifier. Though the unique identifier is shown as a separate identifier, the unique identifier may be the MPD identifier (e.g., manifest identifier) or other identifier. Both the MPD identifier and the representation identifier may be unique identifiers. The unique identifier shown in the initialization segment may be different than the unique identifier shown in the subsequent content segments. The unique identifier in the subsequent content segments may comprise a unique representation identifier.

Figure 4:
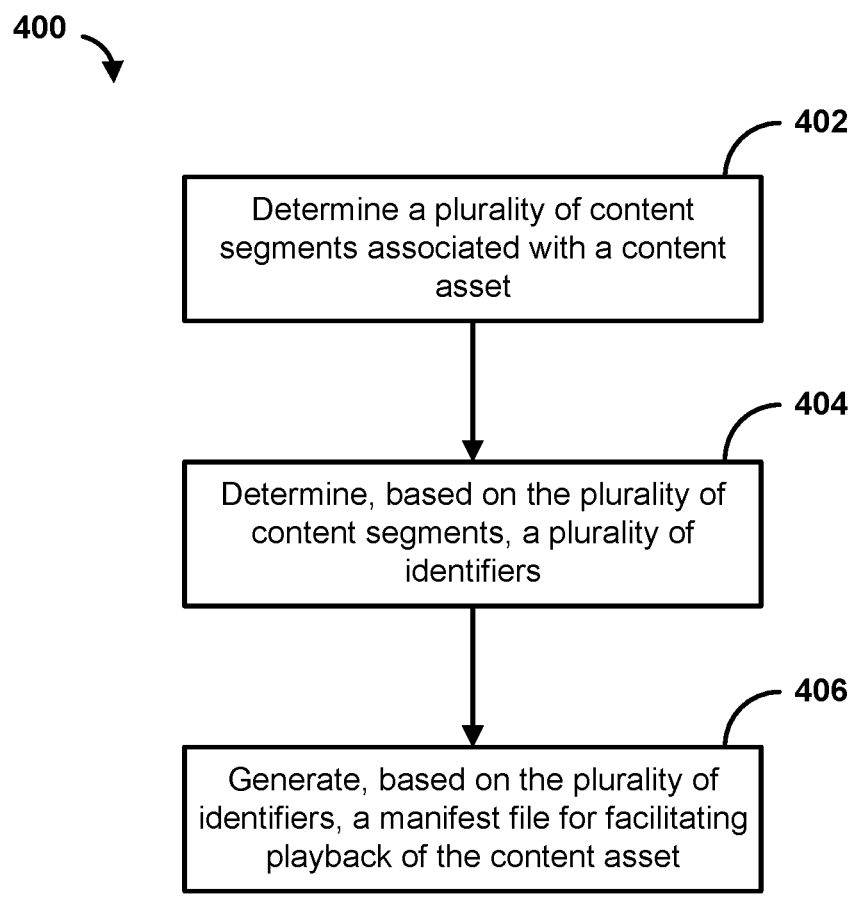
FIG. 4 shows an example method for processing content.

FIG. 4 shows an example method 400 for processing content. The method 400 can comprise a computer implemented method. The method 400 can be implemented by one or more devices (e.g., computing devices, servers) and/or services disclosed herein, such as the devices, storage, and/or services of FIG. 1 and FIG. 7.

At step 402, a plurality of content segments may be determined. The plurality of content segments may be determined by a first device (e.g., first computing device). The first device may comprise one or more of computing device, an origin server, an edge device, a content delivery network device, or a content packager. The plurality of content segments may be generated by a second device. The second device may comprise one or more of a computing device, a content ingest device, or a content encoder. The plurality of content segments may be associated with a content asset. The content asset may comprise video, audio, text, and/or the like. The content asset may comprise a program, show, movie, sporting event, living event, broadcast event, news cast, and/or the like. The plurality of content segments may be determined in a location different than from the location in which the plurality of content segments were generated.

Determining the plurality of content segments may comprise determining the plurality of content segments in one or more of a logical location or a directory of a storage device. A triggering event may cause the plurality of content segments to be determined. The triggering event may comprise a request event (e.g., a request for a content asset associated with the plurality of content segments), a maintenance event (e.g., a deletion event, clean-up event), a storage event (e.g., receiving the plurality of content segments, detecting a change to the plurality of content segments), a packaging event (e.g., packaging of the plurality of content segments), a detection event (e.g., detection that a manifest is missing, inaccessible, and/or not in the directory in which the content segments are stored), a failure event (e.g., failure to complete packaging of the plurality of content segments, a configuration failure), a combination thereof, and/or the like.

At step 404, a plurality of identifiers may be determined (e.g., detected, by the first device). The plurality of identifiers may be stored in the plurality of content segments. Determining the plurality of identifiers may comprise detecting the plurality of identifiers in at least a portion of the plurality of content segments. The plurality of identifiers may be determined from data fields comprising the plurality of identifiers in the plurality of content segments. Determining the plurality of identifiers may comprise analyzing, scanning, and/or reading the plurality of content segments to detect the plurality of identifiers stored in the one or more of the plurality of content segments. The plurality of identifiers may be associated with playback of the content asset. The plurality of identifiers may be indicative of different types of media presentation description fields (e.g., manifest fields) associated with playback of the content asset. The plurality of identifiers may be determined based on the plurality of content segments. The plurality of identifiers may be generated by the second device. The plurality of identifiers may be data identifiers for corresponding data structure elements of a manifest file (e.g., whether created previously or not yet created). The plurality of identifiers may comprise media presentation description identifiers (e.g., for organizing playback of the content asset).

At step 406, a manifest file may be generated. The manifest file may be generated by the first device. The manifest file may be generated based on the plurality of identifiers. The manifest file may facilitate playback of the content asset (e.g., the plurality of content segments). Generating the manifest file may comprise adding, to the manifest file, data structure elements logically organizing the plurality of content segments for playback. The data structure elements may be determined based on the plurality of identifiers and comprise corresponding identifiers based on the plurality of identifiers.

The plurality of identifiers may comprise one or more unique identifiers. The one or more unique identifiers may be selected to be universally unique within a content system to facilitate generation (e.g., and access) of corresponding manifest files. The plurality of identifiers can comprise one or more of a media presentation description identifier (e.g., manifest identifier), a period identifier, an adaptation set identifier (e.g., switching set identifier, content set identifier), or a representation identifier (e.g., encoding identifier).

Generating the manifest file may be based on determining the one or more unique identifiers. For each of the one or more unique identifiers, a list of content segments, of the plurality of content segments, that are associated with the corresponding unique identifier may be determined. One or more data structure elements may be determined based on the list of content segments. The data structure elements may be data structure elements (e.g., or fields, tags) of a media presentation description, a manifest file, and/or the like. One or more identifiers may be determined within content segments of the list of content segments. The one or more identifiers can be indicative of the data structure elements. The one or more identifiers may be indicative of the data structure elements based on the one or more identifiers being located in a field associated with a corresponding data structure element. The one or more identifiers may be indicative of the data structure elements based on the identifiers comprising a code, pattern, symbol, and/or the like that is associated with the corresponding data structure element. The data structure elements can comprise an adaptation set element, a period element, a representation element, and/or the like. Generating the manifest file may comprise generating a data structure identifying the list of content segments as segments of a representation element within one or more of the adaptation set element or the period element.

The plurality of content segments may comprise an initialization segment comprising the plurality of identifiers. The initialization segment may be first in time order of the plurality of content segments. The content segments of the plurality of content segments following the initialization segment may comprise only a portion of the plurality of identifiers. The portion of the plurality of identifiers may comprise a corresponding one of the one or more unique identifiers. The portion of the plurality of identifiers may comprise a corresponding period identifier. Determining the plurality of identifiers may comprise determining the plurality of identifiers in the initialization segment.

Figure 5:
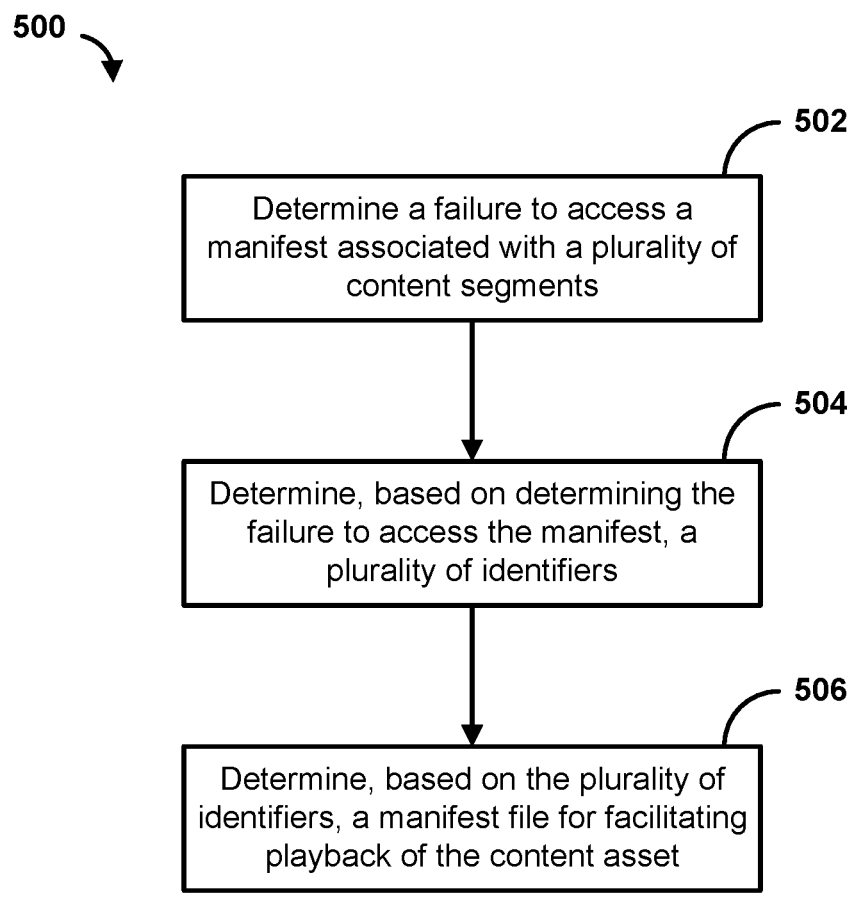
FIG. 5 shows an example method for processing content.

FIG. 5 shows an example method 500 for processing content. The method 500 can comprise a computer implemented method. The method 500 can be implemented by one or more devices (e.g., computing devices, servers) and/or services disclosed herein, such as the devices, storage, and/or services of FIG. 1 and FIG. 7.

At step 502, a failure to access (e.g., located, identify, determine) a manifest associated with a plurality of content segments can be determined. The determination may be made by a first device. The plurality of content segments may be generated by a second device. The first device may comprise one or more of a computing device, an origin server, an edge device, a content delivery network device, or a content packager. The second device may comprise one or more of a computing device, a content ingest device, or a content encoder.

Determining the failure to access the manifest file associated with the plurality of content segments may comprise determining that the manifest file is one or more of deleted, missing, or not yet created. Determining the failure to access the manifest file may be performed based on (e.g., in response to) a triggering event. The triggering event may comprise a request event (e.g., a request for a content asset associated with the plurality of content segments), a maintenance event (e.g., a deletion event, clean-up event), a storage event (e.g., receiving the plurality of content segments, detecting a change to the plurality of content segments), a packaging event (e.g., packaging of the plurality of content segments), a detection event (e.g., detection that a manifest is missing, inaccessible, and/or not in the directory in which the content segments are stored), a failure event (e.g., failure to complete packaging of the plurality of content segments, a configuration failure), a combination thereof, and/or the like.

At step 504, a plurality of identifiers may be determined (e.g., by the first device). The plurality of identifiers may be determined based on (e.g., in response to) determining the failure to access the manifest. The plurality of identifiers may be stored in the plurality of content segments. The plurality of identifiers may be associated with playback of the content asset. The plurality of identifiers may be indicative of different types of media presentation description fields (e.g., manifest fields) associated with playback of the content asset. The plurality of identifiers may be determined based on (e.g., by analyzing) the plurality of content segments. The plurality of identifiers may be generated by the second device. The plurality of identifiers may be data identifiers for corresponding data structure elements of a manifest file (e.g., whether created previously or not yet created). The plurality of identifiers may comprise media presentation description identifiers (e.g., for organizing playback of the content asset).

At step 506, a manifest file for facilitating playback of the content asset (e.g., the plurality of content segments) may be determined (e.g., located, generated). The manifest may be determined by the first device. The manifest may be determined based on the plurality of identifiers. The manifest file may facilitate playback of the content asset (e.g., the plurality of content segments). Generating the manifest file may comprise adding, to the manifest file, data structure elements logically organizing the plurality of content segments for playback. The data structure elements may be determined based on the plurality of identifiers and comprise corresponding identifiers based on the plurality of identifiers.

The plurality of identifiers may comprise one or more unique identifiers. The one or more unique identifiers may be selected to be universally unique within a content system to facilitate generation (e.g., and access) of corresponding manifest files. The plurality of identifiers can comprise one or more of a media presentation description identifier (e.g., manifest identifier), a period identifier, an adaptation set identifier (e.g., switching set identifier, content set identifier), or a representation identifier (e.g., encoding identifier).

Generating the manifest file may be based on determining the one or more unique identifiers. For each of the one or more unique identifiers, a list of content segments, of the plurality of content segments, that are associated with the corresponding unique identifier may be determined. One or more data structure elements may be determined based on the list of content segments. The data structure elements may be data structure elements (e.g., or fields, tags) of a media presentation description, a manifest file, and/or the like. One or more identifiers may be determined within content segments of the list of content segments. The one or more identifiers can be indicative of the data structure elements. The one or more identifiers may be indicative of the data structure elements based on the one or more identifiers being located in a field associated with a corresponding data structure element. The one or more identifiers may be indicative of the data structure elements based on the identifiers comprising a code, pattern, symbol, and/or the like that is associated with the corresponding data structure element. The data structure elements can comprise an adaptation set element, a period element, a representation element, and/or the like. Generating the manifest file may comprise generating a data structure identifying the list of content segments as segments of a representation element within one or more of the adaptation set element or the period element.

The plurality of content segments may comprise an initialization segment comprising the plurality of identifiers. The initialization segment may be first in time order of the plurality of content segments. The content segments of the plurality of content segments following the initialization segment may comprise only a portion of the plurality of identifiers. The portion of the plurality of identifiers may comprise a corresponding one of the one or more unique identifiers. The portion of the plurality of identifiers may comprise a corresponding period identifier. Determining the plurality of identifiers may comprise determining the plurality of identifiers in the initialization segment.

Figure 6:
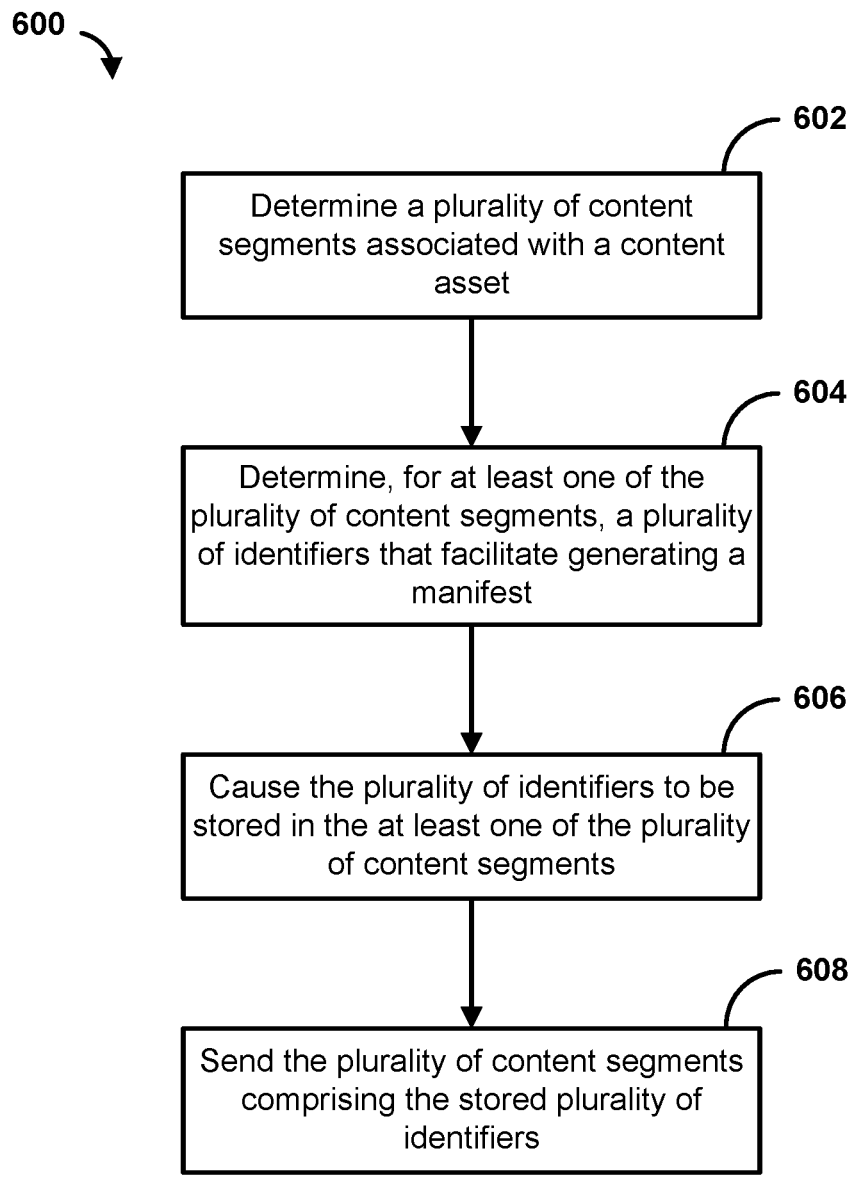
FIG. 6 shows an example method for processing content.

FIG. 6 shows an example method 600 for processing content. The method 600 can comprise a computer implemented method. The method 600 can be implemented by one or more devices (e.g., computing devices, servers) and/or services disclosed herein, such as the devices, storage, and/or services of FIG. 1 and FIG. 7.

At step 602, a plurality of content segments associated with a content asset may be determined. The determination may be made by a first device. The first device may comprise one or more of a computing device, a content ingest device, or a content encoder. Determining the plurality of content segments associated with the content asset may comprise one or more of encoding or segmenting the content asset into the plurality of content segments. The first device may receive content, such as a content stream, from a content source. The first device may subdivide and/or encode the content into the plurality of content segments for storage and/or access by a user device.

At step 604, a plurality of identifiers may be determined for at least one of the plurality of content segments. The plurality of identifiers may facilitate generating a manifest file comprising data for playback of the plurality of content segments. The plurality of identifiers may comprise identifiers for data structure elements (e.g., or fields) a manifest file. The plurality of identifiers may be determined by the first device without generating the manifest file by the first device. The plurality of identifiers may be determined as part of encoding, segmenting, and/or the like of the content.

The plurality of identifiers may comprise one or more unique identifiers that are selected to be universally unique within a content system to facilitate generating corresponding manifest files. The plurality of identifiers may comprise one or more of a media presentation description identifier, a period identifier, an adaption set identifier, or a representation identifier.

At step 606, the plurality of identifiers may be caused to be stored in the at least one of the plurality of content segments. The plurality of content segments may comprise an initialization segment comprising the plurality of identifiers. The content segments of the plurality of content segments following the initialization segment may comprise only a portion of the plurality of identifiers. The portion of the plurality of identifiers may comprise a corresponding one of the one or more unique identifiers. The portion of the plurality of identifiers may comprise a period identifier.

At step 608, the plurality of content segments comprising the stored plurality of identifiers may be sent. The plurality of content segments comprising the stored plurality of identifiers may be sent to a second device. The second device may comprise one or more of a computing device, an origin server, an edge device, a content delivery network device, or a content packager. Sending the plurality of content segments comprising the stored plurality of identifiers may comprise sending (e.g., to the second device) the plurality of content segments without sending a manifest file for playback of the plurality of content segments.

Figure 7:
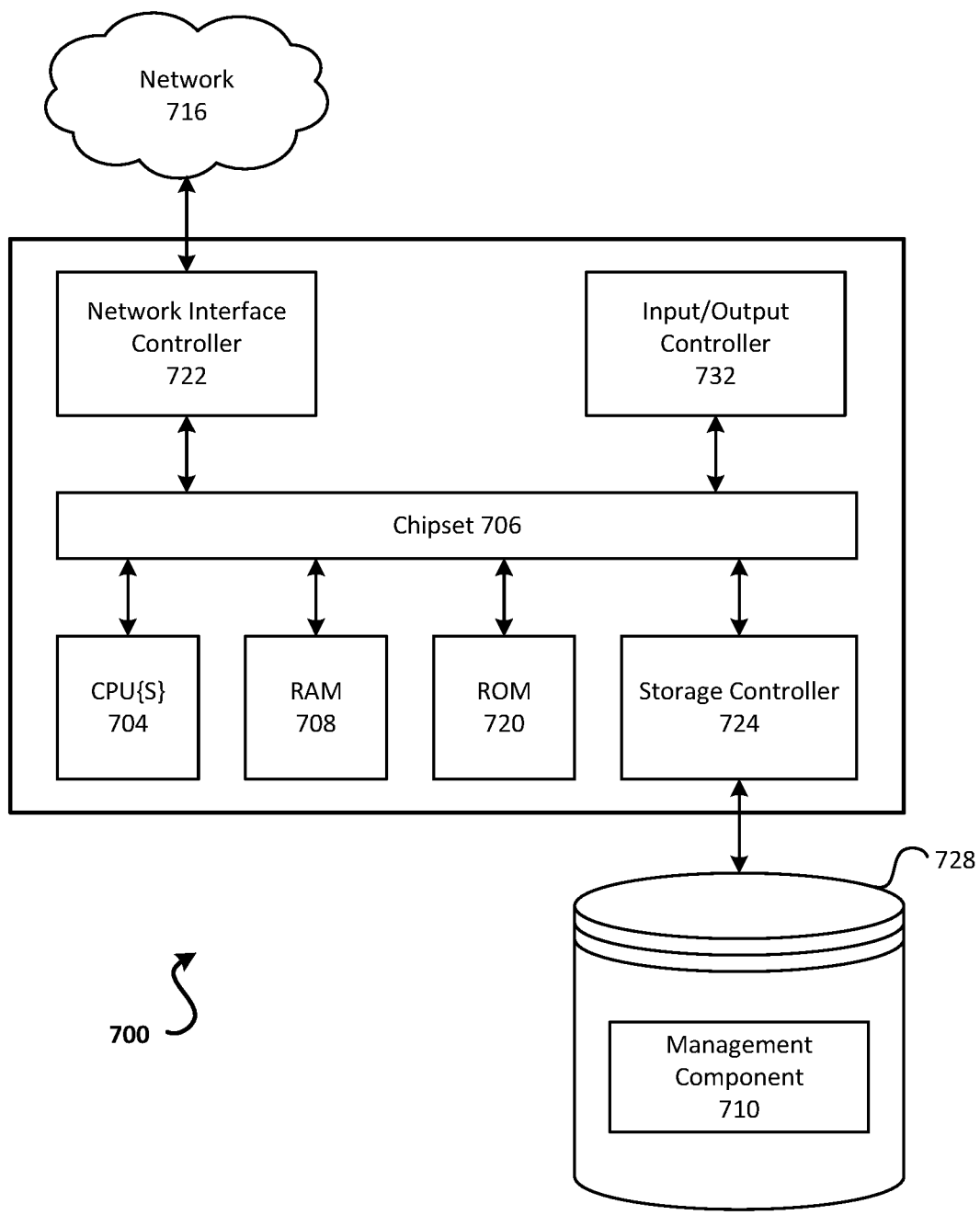
FIG. 7 is a block diagram illustrating an example computing device.

FIG. 7 depicts a computing device that may be used in various aspects, such as the servers, nodes, and/or devices depicted in FIG. 1. With regard to the example architecture of FIG. 1, the content source 102, ingest service 104, storage service 106, content service 108, and user device 110 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 4-6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described above, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described above. The computing device 700 may have access to computer-readable storage media storing computer-executable instructions, which, when executed by the computing device 700, may perform the methods described in relation to FIGS. 4-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A computer-readable medium storing instructions that, when executed, cause:
   determining, by a first device, a request for a content asset associated with a plurality of content segments generated by a second device;
   determining, based on determining the request for the content asset, a plurality of identifiers stored in the plurality of content segments and indicative of different types of data structure elements; and
   causing, by the first device and based on the plurality of identifiers, generation of a manifest file for facilitating playback of the plurality of content segments.

2. The computer-readable medium of claim 1, wherein the plurality of identifiers comprise one or more identifiers that are selected to be universally unique within a content system to facilitate generation of corresponding manifest files, and wherein the plurality of identifiers comprise one or more of a media presentation description identifier, a period identifier, an adaptation set identifier, or a representation identifier.

3. The computer-readable medium of claim 2, wherein the instructions, when executed, further cause:
   determining, for each of the one or more identifiers, a list of content segments, of the plurality of content segments, that are associated with the corresponding one of the one or more identifiers; and
   determining, based on the plurality of identifiers, one or more of an adaptation set element or a period element associated with the list of content segments,
   wherein causing generation of the manifest file comprises generating a data structure identifying the list of content segments as content segments of a representation element within one or more of the adaptation set element or the period element.

4. The computer-readable medium of claim 2, wherein the plurality of content segments comprise an initialization segment comprising the plurality of identifiers, and wherein content segments of the plurality of content segments following the initialization segment comprise only a portion of the plurality of identifiers, and wherein the portion of the plurality of identifiers comprises a corresponding one of the one or more identifiers.

5. The computer-readable medium of claim 1, wherein causing generation of the manifest file comprises adding, to the manifest file, data structure elements logically organizing the plurality of content segments for playback, wherein the data structure elements are determined based on the plurality of identifiers and comprise corresponding identifiers based on the plurality of identifiers.

6. The computer-readable medium of claim 1, wherein determining, by the first device, the request for the content asset associated with the plurality of content segments generated by the second device comprises receiving the request from at least one user.

7. The computer-readable medium of claim 1, wherein the first device comprises one or more of an origin server, an edge device, a content delivery network device, or a content packager, and wherein the second device comprises one or more of a content ingest device or a content encoder.

8. A computer-readable medium storing instructions that, when executed, cause:
   determining, by a first device and for at least one of a plurality of content segments associated with a content asset, a plurality of identifiers indicative of different types of data structure elements;
   causing the plurality of identifiers to be stored in the at least one of the plurality of content segments; and
   sending, to a second device, the plurality of content segments comprising the stored plurality of identifiers.

9. The computer-readable medium of claim 8, wherein the plurality of identifiers comprise one or more identifiers that are selected to be universally unique within a content system to facilitate generation of corresponding manifest files, and wherein the plurality of identifiers comprise one or more of a media presentation description identifier, a period identifier, an adaptation set identifier, or a representation identifier.

10. The computer-readable medium of claim 9, wherein the plurality of content segments comprise an initialization segment comprising the plurality of identifiers, and wherein content segments of the plurality of content segments following the initialization segment comprise only a portion of the plurality of identifiers, and wherein the portion of the plurality of identifiers comprises a corresponding one of the one or more identifiers.

11. The computer-readable medium of claim 8, wherein sending, to the second device, the plurality of content segments comprising the stored plurality of identifiers comprises sending, to the second device, the plurality of content segments without sending a manifest file for playback of the plurality of content segments.

12. The computer-readable medium of claim 8, wherein the plurality of content segments associated with the content asset are determined by one or more of encoding or segmenting the content asset into the plurality of content segments.

13. The computer-readable medium of claim 8, wherein the first device comprises one or more of an origin server, an edge device, a content delivery network device, or a content packager, and wherein the second device comprises one or more of a content ingest device or a content encoder.

14. A computer-readable medium storing instructions that, when executed, cause:
 determining, by a first device, a failure to access a manifest associated with a plurality of content segments generated by a second device;
 determining, based on determining the failure to access the manifest, a plurality of identifiers stored in the plurality of content segments and indicative of different types of data structure elements; and
 generating, by the first device and based on the plurality of identifiers, a manifest file for facilitating playback of the plurality of content segments.

15. The computer-readable medium of claim 14, wherein the plurality of identifiers comprise one or more unique identifiers that are selected to be universally unique within a content system to facilitate generate of corresponding manifest files, and wherein the plurality of identifiers comprise one or more of a media presentation description identifier, a period identifier, an adaptation set identifier, or a representation identifier.

16. The computer-readable medium of claim 15, wherein the instructions, when executed, further cause:
 determining, for each of the one or more unique identifiers, a list of content segments, of the plurality of content segments, that are associated with the corresponding unique identifier; and
 determining, based on the plurality of identifiers, one or more of an adaptation set element or a period element associated with the list of content segments,
 wherein generating the manifest file comprises generating a data structure identifying the list of content segments as content segments of a representation element within one or more of the adaptation set element or the period element.

17. The computer-readable medium of claim 15, wherein the plurality of content segments comprise an initialization segment comprising the plurality of identifiers, and wherein content segments of the plurality of content segments following the initialization segment comprise only a portion of the plurality of identifiers, and wherein the portion of the plurality of identifiers comprises a corresponding one of the one or more unique identifiers.

18. The computer-readable medium of claim 14, wherein generating the manifest file comprises adding, to the manifest file, data structure elements logically organizing the plurality of content segments for playback, wherein the data structure elements are determined based on the plurality of identifiers and comprise corresponding identifiers based on the plurality of identifiers.

19. The computer-readable medium of claim 14, wherein determining the failure to access the manifest file associated with the plurality of content segments comprises determining that the manifest file is one or more of deleted, missing, or not yet created.

20. The computer-readable medium of claim 14, wherein the first device comprises one or more of an origin server, an edge device, a content delivery network device, or a content packager, and wherein the second device comprises one or more of a content ingest device or a content encoder.

21. A system comprising:
 a first computing device configured to generate a plurality of content segments; and
 a second computing device configured to:
  determine a failure to access a manifest associated with the plurality of content segments;
  determine, based on determining the failure to access the manifest, a plurality of identifiers stored in the plurality of content segments and indicative of different types of data structure elements; and
  generate, based on the plurality of identifiers, a manifest file for facilitating playback of the plurality of content segments.

22. The system of claim 21, wherein the plurality of identifiers comprise one or more unique identifiers that are selected to be universally unique within a content system to facilitate generate of corresponding manifest files, and wherein the plurality of identifiers comprise one or more of a media presentation description identifier, a period identifier, an adaptation set identifier, or a representation identifier.

23. The system of claim 22, wherein the second computing device is further configured to:
 determine, for each of the one or more unique identifiers, a list of content segments, of the plurality of content segments, that are associated with the corresponding unique identifier; and
 determine, based on the plurality of identifiers, one or more of an adaptation set element or a period element associated with the list of content segments,
 wherein generating the manifest file comprises generating a data structure identifying the list of content segments as content segments of a representation element within one or more of the adaptation set element or the period element.

24. The system of claim 22, wherein the plurality of content segments comprise an initialization segment comprising the plurality of identifiers, and wherein content segments of the plurality of content segments following the initialization segment comprise only a portion of the plurality of identifiers, and wherein the portion of the plurality of identifiers comprises a corresponding one of the one or more unique identifiers.

25. The system of claim 21, wherein the second computing device is configured to generate the manifest file by adding, to the manifest file, data structure elements logically organizing the plurality of content segments for playback, wherein the data structure elements are determined based on the plurality of identifiers and comprise corresponding identifiers based on the plurality of identifiers.

26. The system of claim 21, wherein the second computing device is configured to determine the failure to access the manifest file associated with the plurality of content segments by determining that the manifest file is one or more of deleted, missing, or not yet created.

27. The system of claim 21, wherein the first computing device comprises one or more of a content ingest device or a content encoder, and wherein the second computing device comprises one or more of an origin server, an edge device, a content delivery network device, or a content packager, and wherein the second computing device comprises one or more of a content ingest device or a content encoder.

* * * * *